(12) United States Patent
O'Keeffe et al.

(10) Patent No.: US 7,253,804 B2
(45) Date of Patent: Aug. 7, 2007

(54) INPUT DEVICE WITH INTEGRATED KEY PLATE AND INTEGRATED SIDE GRIPS

(75) Inventors: Denis O'Keeffe, County Cork (IE); Neil O'Connell, Cork City (IE); Anita Chiu, Hsinchu (TW); Alex Sung, Chu-Pei (TW); Jack Hung, Hsinchu (TW); Martin Gleeson, County Cork (IE); Fergal Corcoran, County Clare (IE)

(73) Assignee: Logitech Europe S.A. (CH)

( * ) Notice: Subject to any disclaimer, the term of this patent is extended or adjusted under 35 U.S.C. 154(b) by 290 days.

(21) Appl. No.: 10/659,217

(22) Filed: Sep. 9, 2003

(65) Prior Publication Data

US 2004/0051696 A1    Mar. 18, 2004

Related U.S. Application Data

(60) Provisional application No. 60/410,423, filed on Sep. 12, 2002.

(51) Int. Cl.
*G09G 5/08* (2006.01)

(52) U.S. Cl. ...................................... 345/163
(58) Field of Classification Search ......... 345/156–167
See application file for complete search history.

(56) References Cited

U.S. PATENT DOCUMENTS 6,323,843 B2 * 11/2001 Giles et al. .................. 345/163
6,801,967 B2 * 10/2004 Nakamura et al. ............. 710/62
2002/0135562 A1 * 9/2002 Wu ............................. 345/163
2002/0167482 A1 * 11/2002 Yin ............................. 345/156
2003/0001819 A1 * 1/2003 Su .............................. 345/163
2003/0160762 A1 * 8/2003 Lu .............................. 345/163

* cited by examiner

*Primary Examiner*—Amr A. Awad
*Assistant Examiner*—Stephen G Sherman
(74) *Attorney, Agent, or Firm*—Townsend and Townsend and Crew LLP

(57) ABSTRACT

The present invention provides an input device such as a mouse which has a unique construction with integrated key plates and integrated side grips. In one embodiment, the input device comprises a housing, which includes a bottom case and an upper member disposed above the bottom case. The upper member includes a palm rest configured to support a user's palm and at least one key plate extending continuously from the palm rest to form a hinge between the at least one key plate and the palm rest without a gap. The key plate is movable in bending relative to the palm rest at the hinge to activate a key switch. The left side grip and the right side grip are formed on a single piece top case connected between the upper member and the bottom case. The left side grip and right side grip typically have concave surfaces.

7 Claims, 6 Drawing Sheets

US 7,253,804 B2

INPUT DEVICE WITH INTEGRATED KEY PLATE AND INTEGRATED SIDE GRIPS

CROSS-REFERENCES TO RELATED APPLICATIONS

This application claims benefit under 35 U.S.C. 119(e) of U.S. Provisional Patent Application No. 60/410,423, filed on Sep. 12, 2002, which are both incorporated by reference herein for all purposes.

BACKGROUND OF THE INVENTION

The present invention relates to input devices and, more particularly, to an input device such as a mouse which includes one or more key plates and side grips that are integrated into the other structural features of the device.

Convention mouse devices have key plates that are separately formed and assembled with the body of the mouse to form hinges or that are formed integrally with the body of the mouse to include U-shaped hinges or the like. When the key plates are pressed, bending of the key plates relative to the body occurs at the hinges that form gaps between the key plates and the body of the mouse. Additional visible gaps are also observed along the edges of the key plates and along edges of other components that are assembled together to form the body, such as the top and bottom cases.

BRIEF SUMMARY OF THE INVENTION

The present invention provides an input device such as a mouse which has a unique construction with integrated key plates and integrated side grips. The left side grip and the right side grip are formed on a single piece top case. The key plates are formed with the palm rest as a single piece upper member disposed above the top case. Hinges of reduced thicknesses are formed between the key plates and the palm rest in the upper member to facilitate bending without any gaps. The edges of the key plates are beveled to substantially conceal gaps between the key plates and the top case.

In accordance with an aspect of the present invention, an input device comprises a housing, which includes a bottom case and an upper member disposed above the bottom case. The upper member includes a palm rest configured to support a user's palm and at least one key plate extending continuously from the palm rest to form a hinge between the at least one key plate and the palm rest without a gap. The key plate is movable in bending relative to the palm rest at the hinge to activate a key switch.

In some embodiments, the hinge comprises a hinge recess which is smaller in thickness than the palm rest and the key plate. The hinge recess decreases in thickness gradually from the palm rest and from the at least one key plate, reaching a minimum thickness at an intermediate location between the palm rest and at least one key plate.

In specific embodiments, a left key plate and a right key plate extend forward from the palm rest. The left hinge recess is angled forward and outward to the left from a central region of the upper member, and the right hinge recess is angled forward and outward to the right from the central region of the upper member. The left key plate and right key plate are spaced from one another by a spacing. An island is disposed in the spacing and connected between the left key plate and the right key plate.

In accordance with another aspect of the invention, an input device comprises a housing, which includes a bottom case, a top case connected to the bottom case, and an upper member connected to the top case and including a palm rest configured to support the user's palm. The top case includes a left side grip and a right side grip being formed on a single piece component. The left side grip and the right side grip are configured to be held by a user's thumb on one side and by at least one of the user's ring finger and little finger on another side.

In some embodiments, the single piece component includes a front connected between the left side grip and the right side grip. At least one of the left side grip and the right side grip has a concave surface. A portion of the single piece component has a hollow interior. The single piece component having the hollow interior may be formed by gas assisted injection molding. The single piece component has a thick portion which is thicker than a thin portion. The thin portion comprises a first material and the thick portion comprises the first material and a second material. The single piece component having the thick portion and the thin portion may be formed by dual material injection molding.

In accordance with another aspect of the invention, an input device comprises a housing which includes a bottom case, a top case connected to the bottom case, and an upper member connected to the top case. The top case includes a left side grip and a right side grip, which are configured to be held by a user's thumb on one side and by at least one of the user's ring finger and little finger on another side. The upper member includes a palm rest configured to support the user's palm and at least one key plate connected to the palm rest by a hinge without a gap. The key plate is movable in bending relative to the palm rest at the hinge.

DETAILED DESCRIPTION OF THE INVENTION

Figure 1:
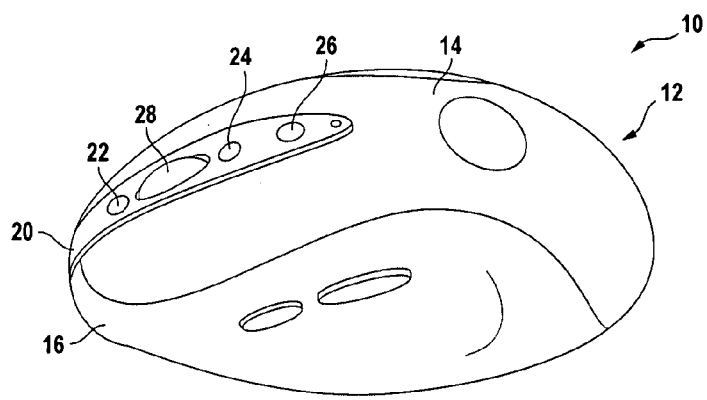
FIGS. 1-3 are perspective views of an input device according to an embodiment of the present invention.
Figure 2:
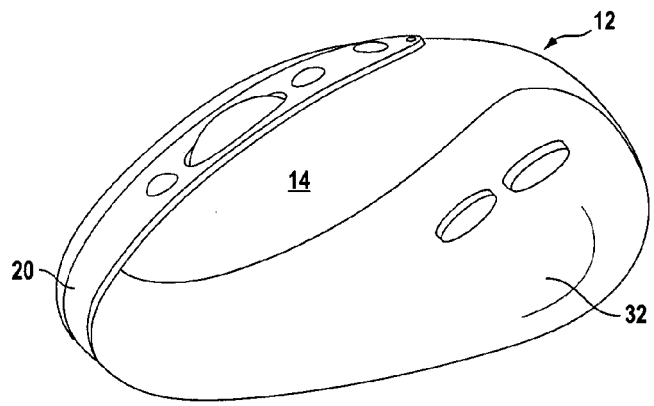
Figure 3:
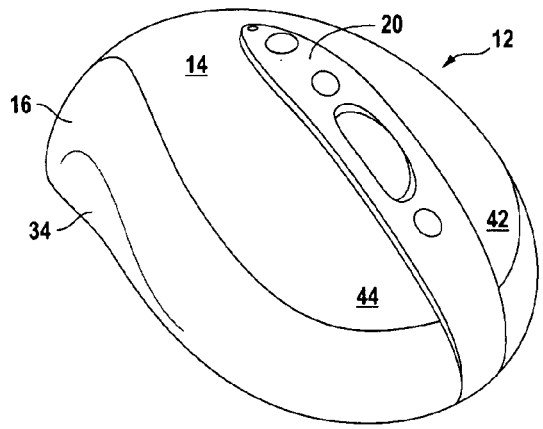

FIGS. 1-3 show an input device 10, which is a mouse, but may be a trackball or the like in other embodiments. The input device 10 includes a housing 12 having an upper member 14 connected to a top case 16 which is connected to a base or bottom case 18. The housing 12 is typically made of a plastic material. The upper member 14 is preferably a single piece component integrating key plates with a palm rest, as described in more detail below. A separate island cover 20 is provided for one or more additional user-manipulable members, and is connected to the upper member 14. In the embodiment shown, the user-manipulable members include an up button 22, a down button 24, a third button 26 which may be a special function button, and a roller 28. Additional user-manipulable members may be provided in other embodiments. The buttons and the roller extend through openings of the island 20 to allow a user's finger(s) to contact and operate them. As best seen in FIGS. 2 and 3, the top case 16 includes a left side grip 32 and a right side grip 34, which are configured to be held by a user's thumb on one side and by the user's ring finger and/or little finger on the other side. The left and right side grips 32, 34 are desirably concave in shape. As discussed in greater detail below, the left and right side grips 32, 34 are desirably formed on a single piece component.

Figure 4:
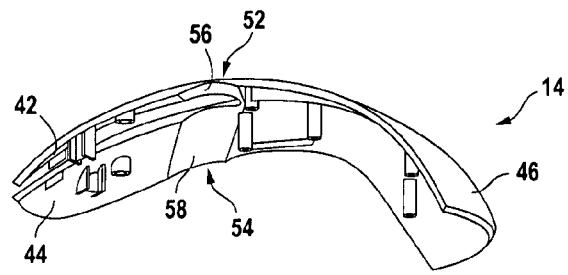
FIG. 4 is a perspective view of an upper member of the input device having integrated key plates and a palm rest to form a hinge therebetween.

As seen in FIGS. 3 and 4, the single piece upper member 14 includes a left key plate 42 and a right key plate 44 which are spaced from one another by the island 20. The key plates 42, 44 extend continuously from a palm rest 46 which is configured to support the user's palm. In the embodiment shown, the palm rest 46 forms the back of the mouse 10 and extends to the rear edge of the bottom case 18. The palm rest 46 is fixed, for instance, to the top case 16 or the bottom case 18 by fasteners or the like. The key plates 42, 44 extend continuously from the palm rest 46 to form left and right hinges 52, 54 to allow movement of the left and right key plates 42, 44 relative to the palm rest 46 to activate key switches as the single piece upper member 14 bends at the hinges 50, 52. The left and right hinges 50, 52 include left and right hinge recesses 56, 58 which are smaller in cross-section than the rest of the upper member 14. More specifically, the hinge recesses 56, 58 decrease in thickness, desirably gradually, from the palm rest 46 and from the key plates 42, 44, each reaching a minimum thickness at an intermediate location between the palm rest 46 and the key plates 42, 44. The hinge recesses 56, 58 allow plastic flow of the material to permit resilient bending of the upper member 14 at the hinges 52, 54.

Figure 5:
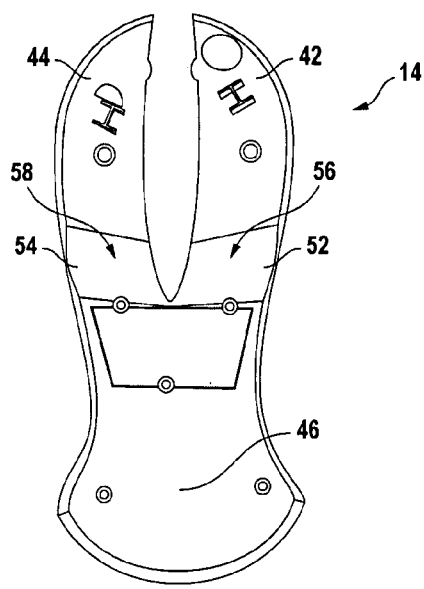
FIG. 5 is a bottom plan view of the upper member of FIG. 4 showing angled hinge recesses.

As shown in FIG. 5, the hinge recesses 56, 58 are desirably angled to allow the key plates 42, 44 to travel substantially vertically when pressed by the user's fingers to activate key switches. Because the key plates 42, 44 are not flat but are curved and contoured inward, their front portions tend to bend toward one another when pressed downward by the user. To reduce this "closing-in" effect so that the key plates 42, 44 move substantially vertically when pressed downward, the hinge recesses 56, 58 are angled to introduce an outward movement. In the specific embodiment shown, the left hinge recess 56 is angled forward as it extends outward to the left from the central region of the upper member 14, while the right hinge recess 58 is angled forward as it extends outward to the right from the central region of the upper member 14. This nonlinear hinge geometry increases the life of the key switches that are activated by the key plates 42, 44, and improves the feel of the user.

Figure 6:
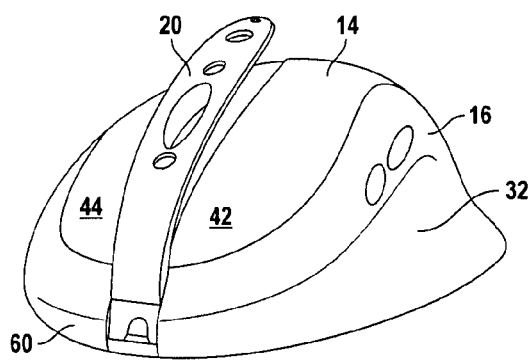
FIGS. 6 and 7 are exploded perspective views of the input device of FIG. 1 showing the connection of an island with the upper member.
Figure 7:
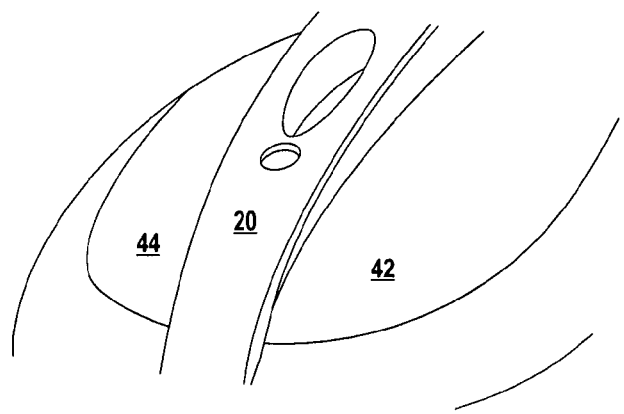

FIGS. 6 and 7 illustrate the assembly of the island cover 20 with the upper member 14 which is connected to the top case 16. The island cover 20 extends forward to the front 60 of the top case 16, and is pressed downward onto the upper member 14 to retain the key plates 42, 44 and to hide the gaps along the opposite edges of the key plates 42, 44 that would otherwise be visible from above. The island cover 20 includes openings for the user-manipulable members to be exposed for contact and operation by the user's finger(s). As seen in FIG. 7, one or more tabs 62 are desirably provided to secure the connection between the island cover 20 and the key plates 42, 44 to prevent pop out of the components in a drop test.

Figure 8:
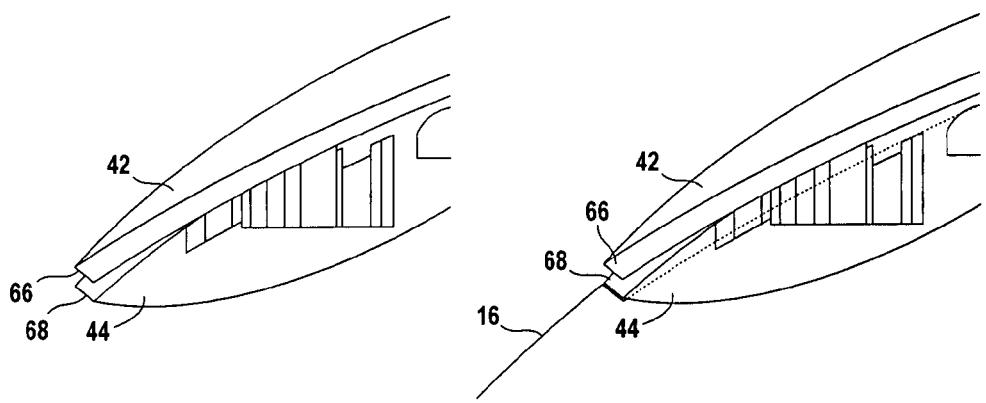
FIG. 8 is a perspective view of the upper member of FIG. 4 illustrating beveled edges.

FIG. 8 shows beveled front edges 66, 68 of the key plates 42, 44 which facilitate the vertical travel of the key plates 42, 44 with respect to the top case 16 while minimizing the visual gaps between the key plates 42, 44 and the top case 16. Instead of being formed at about 90° relative to the exterior surface of the key plates 42, 44, the front edges 66, 68 are beveled inwardly by an angle. The upper member 14 may include interior voids formed by gas assisted injection molding or the like to reduce material volume and material cost.

Figure 9:
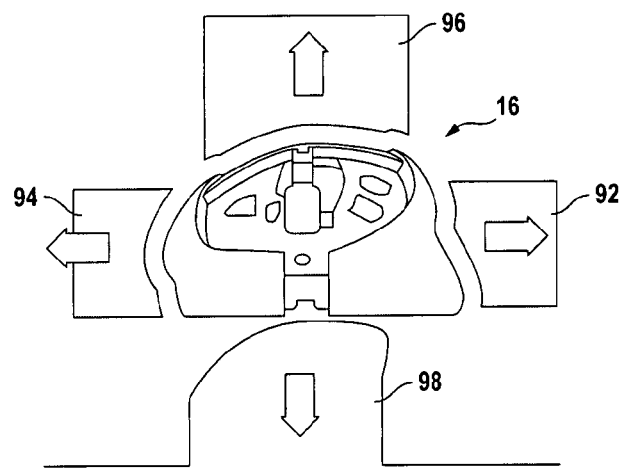
FIGS. 9 and 10 are elevational views illustrating molding of the input device of FIG. 1 using a slider construction.
Figure 10:
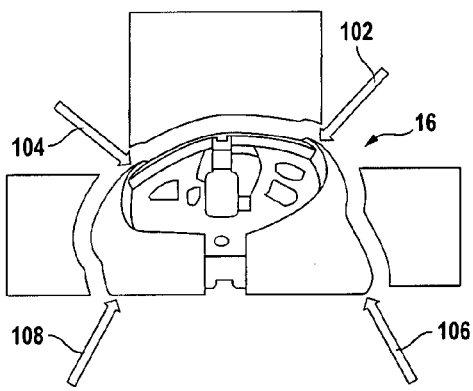

In the specific embodiment shown, the side grips 32, 34 is connected at the front 60, and are integrated to the top case 16 to form a single piece component. The top case 16 may be formed by injection molding using a slider construction as illustrated in FIGS. 9 and 10. FIG. 9 shows four sliders 92, 94, 96, 98 for molding the single piece top case 16. The molding process may involve a combination of dual material injection molding and gas assisted injection molding, as discussed below. The use of injection molding with sliders to form a single piece top case 16 advantageously eliminates visible tooling witness lines on the external surfaces. As seen in FIG. 10, the witness lines 102, 104, 106, 108 will be obscured by the upper member 14 or disposed at the bottom.

Figure 11:
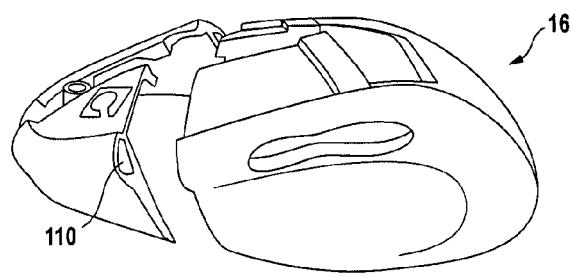
FIG. 11 is an exploded perspective view of the input device of FIG. 1 showing a top case with voids formed by gas-assisted injection molding.
Figure 12:
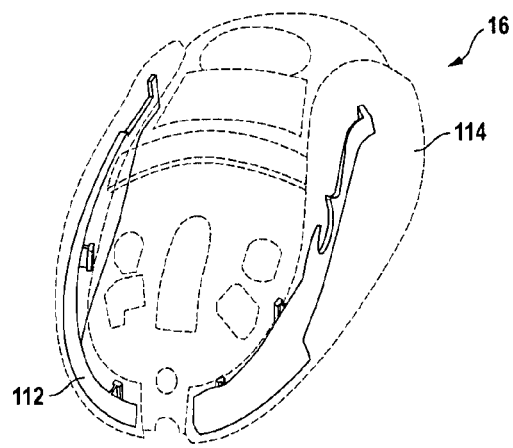
FIGS. 12 and 13 are perspective views of the top case formed by dual material injection molding.
Figure 13:
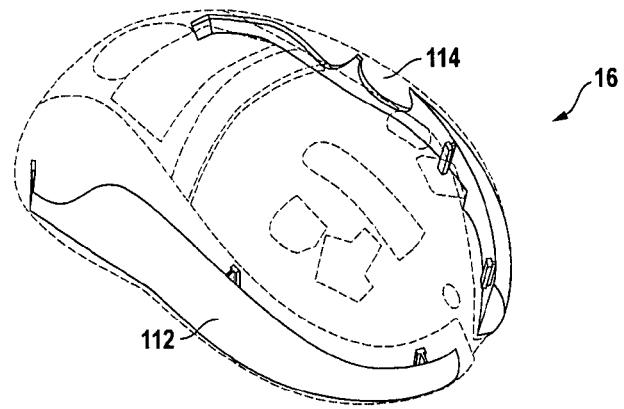

As shown in FIG. 11, interior voids 110 are formed inside the cross-section of the top case 16 to reduce material volume and material cost. This may be accomplished by using gas assisted injection or the like, so that the voids 110 are formed upon cooling of the material after the injection molding process. The interior voids 110 are typically formed in thick portions of the top case 16. Moreover, the top case 16 may be formed using dual material injection molding to include undercuts or concave grip portions 32, 34 and to enable ejection of the part after molding. As best seen in FIGS. 12 and 13, a first material is injected as the first layer 112 of the thick wall sections of the top case 16. A second material is injected to form the second layer 114 of the thick wall sections and the thin wall sections of the top case 16. The thin wall sections typically include the concave side grips 32, 34. The dual material injection molding process may employ the gas assisted injection technique.

Figure 14:
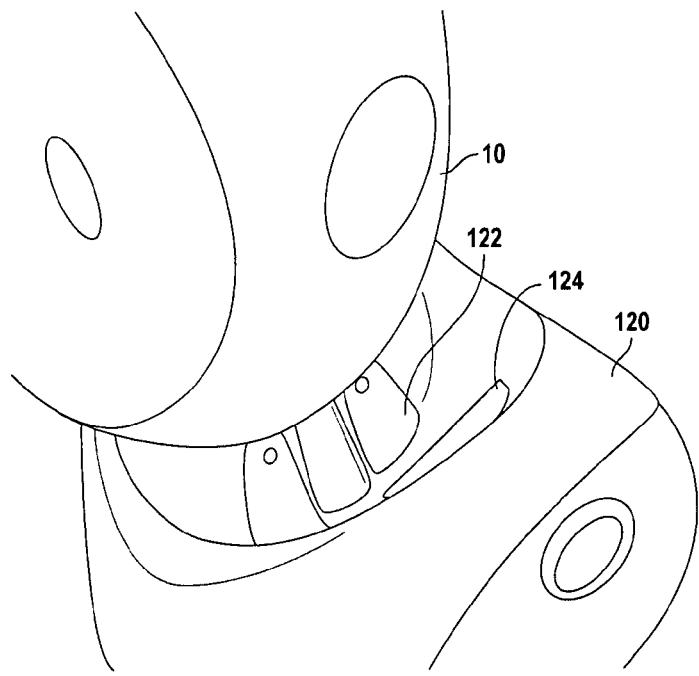
FIG. 14 is a perspective view of the input device of FIG. 1 and a recharge device.
Figure 15:
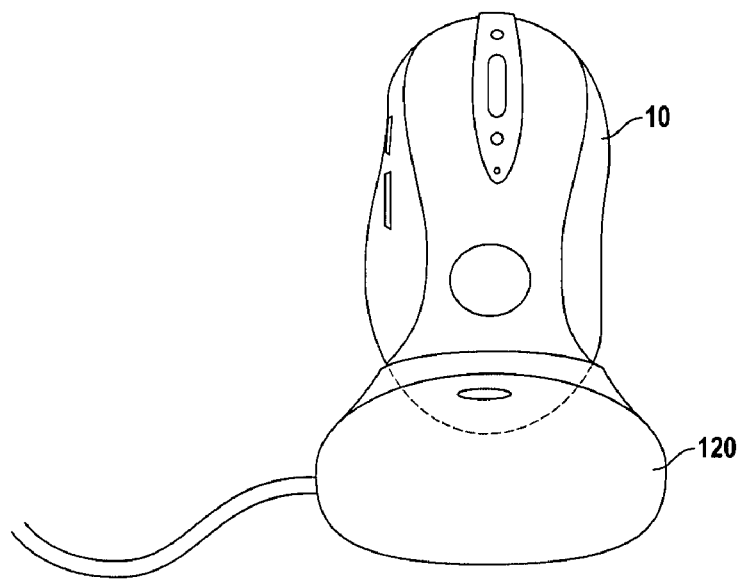
FIG. 15 is an elevational view of the input device and recharge device of FIG. 14.
Figure 16:
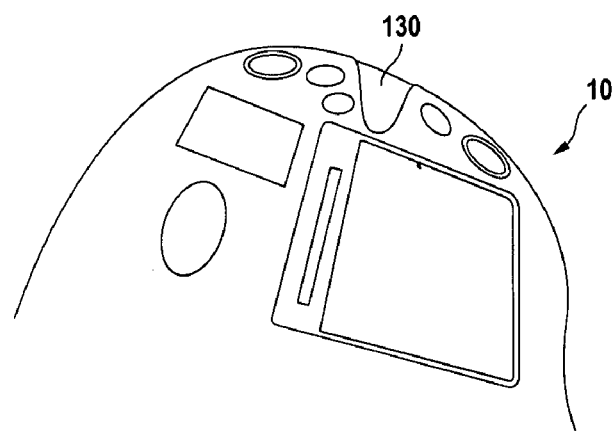
FIG. 16 is a perspective view of the bottom of the input device of FIG. 1 showing an alignment groove for aligning with the recharge device.

The mouse 10 may be a cordless device that can be recharged. FIGS. 14-16 show a recharge device 120 used to recharge the mouse 10. The recharge device 120 includes a cavity 122 for receiving the back of the mouse 10 to facilitate electrical contacts between the recharge device 120 and the mouse 10 for recharging the mouse 10. A pillow or cushion 124 is desirably provided in the cavity 122 for contacting the mouse 10 to prevent paint damage and to allow precise fitting. The cavity 122 is sufficiently deep to provide stable support for the mouse 10 but desirably is as shallow as possible to maintain a minimum interpenetration interface. To ensure proper alignment between the mouse 10 and the recharge device 120, an alignment groove 130 is desirably provided at the bottom case 18 of the mouse 10 (FIG. 16) to mate with an alignment protrusion 132 in the cavity 122 of the recharge device 120 (FIG. 14).

The above-described arrangements of apparatus and methods are merely illustrative of applications of the principles of this invention and many other embodiments and modifications may be made without departing from the spirit and scope of the invention as defined in the claims. For instance, the shapes and sizes of the components of the housing 12 of the mouse 10 may be different. The scope of the invention should, therefore, be determined not with reference to the above description, but instead should be determined with reference to the appended claims along with their full scope of equivalents.

What is claimed is:

1. An input device comprising:
 a housing having:
 a bottom case having a bottom surface with an alignment groove formed in the bottom surface and extending below the bottom surface, wherein the alignment grove is configured to receive into the alignment groove an alignment protrusion that extends from a surface of a charging base configured to receive the input device for charging the input device, and the alignment groove is substantially triangular to guide the alignment protrusion to the alignment groove as the input device is placed in the charging base;
 a top case connected to the bottom case, the top case including a left side grip and a right side grip being formed on a single piece component, the left side grip and the right side grip being configured to be held by a user's thumb on one side and by at least one of the user's ring finger and little finger on another side; and
 an upper member connected to the top case and including a palm rest configured to support the user's palm.

2. The input device of claim 1 wherein the single piece component includes a front connected between the left side grip and the right side grip.

3. The input device of claim 1 wherein at least one of the left side grip and the right side grip has a concave surface.

4. The input device of claim 1 wherein a portion of the single piece component has a hollow interior.

5. The input device of claim 4 wherein the single piece component having the hollow interior is formed by gas assisted injection molding.

6. The input device of claim 1 wherein the single piece component has a thick portion which is thicker than a thin portion, and wherein the thin portion comprises a first material and wherein the thick portion comprises the first material and a second material.

7. The input device of claim 6 wherein the single piece component having the thick portion and the thin portion is formed by dual material injection molding.

* * * * *